April 27, 1937.  J. W. GIBNEY  2,078,658
METHOD OF MAKING NUT BLANKS
Filed Aug. 26, 1936
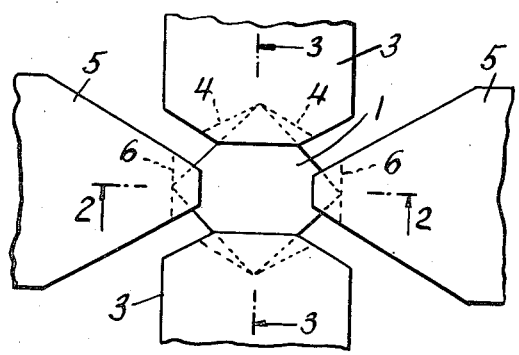
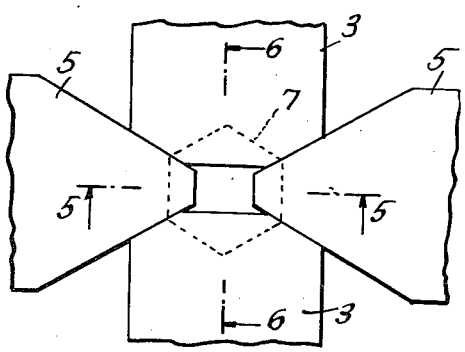
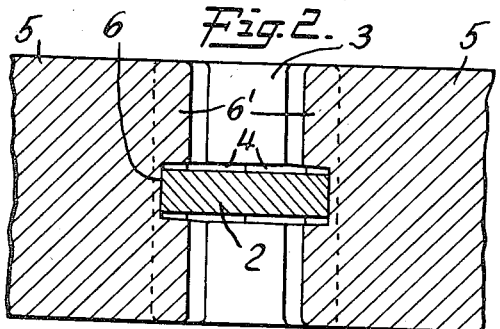
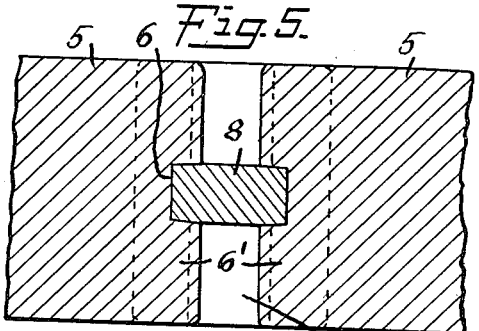
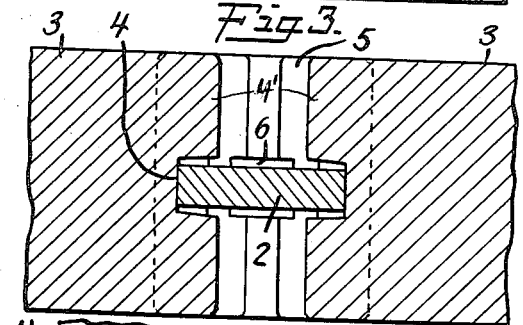
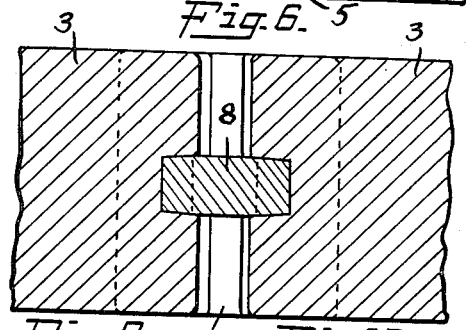
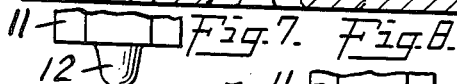
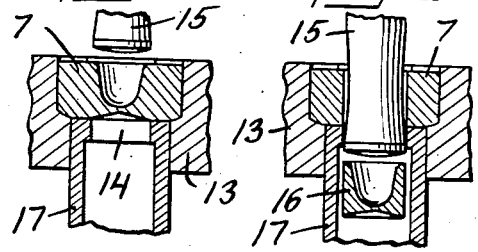
INVENTOR
Joseph W. Gibney
BY
Paulie Davis Marvin + Edmunds
ATTORNEYS Patented Apr. 27, 1937

2,078,658

UNITED STATES PATENT OFFICE 2,078,658

METHOD OF MAKING NUT BLANKS

Joseph William Gibney, Port Chester, N. Y., assignor to Russell, Burdsall & Ward Bolt & Nut Company, Port Chester, N. Y., a corporation of New York Application August 26, 1936, Serial No. 97,886

4 Claims. (Cl. 10—86)

This invention relates to the production of hexagonal nut blanks from blanks of cold metal. In my prior Patent No. 1,957,952 granted May 8, 1934 I have disclosed and claimed a method in which rhombic shaped blanks are submitted to pressure along their longer diagonals to produce a hexagonal blank.

The present invention is an improvement over the method disclosed in said patent. In place of the rhombic shaped blanks disclosed in the patent I employ a blank that is substantially square and submit it to pressure from all four corners. The application of pressure at the four corners of the substantially square blank produces a greater concentration of pressure on the rough, cut-off sides of the blank and fills the corners of the hexagonal blank better than by the methods heretofore employed. This pressure also makes it possible to put as much surplus metal in the corners of the hexagonal blank as is necessary to smooth out the roughness resulting from the rough cut of the original blank from a bar or strip.

A further advantage resulting from the present invention resides in the fact that more blanks may be cut from stock of the same length, and an additional advantage is that the use of a substantially square blank produces less distortion of the corners in the cutting of the blank.

A further advantage of the present method resides in the fact that the metal has less distance to move and less distortion therefore results in the reshaping of the metal from the original blank to the hexagonal blank. In addition variation in the size of the blank, due to variation in stock or other causes does not affect the diameter of the hexagonal blank produced.

In practicing the process, substantially square blanks are cut from bars or strips in any suitable manner, as by a punch. The thickness of the blank, that is the dimension from opposite faces, is slightly less than that of the nut to be produced. These blanks, in a cold state, are placed in a shaping mechanism with the four corners of the square blank engaged by the shaping members and are then submitted to pressure from all four corners whereby they are compressed into blanks which are substantially hexagonal in outline and are expanded in the direction of their thickness to practically the thickness of the finished blank. The pieces are then subjected to the action of a punch in a hexagonal die to recess one or both faces and cause a radial expansion of the metal to final hexagonal form with smooth edge faces. The blanks may then be pierced by punching out the small amount of metal remaining in the recess and are then ready for threading.

In the accompanying drawing wherein the process is diagrammatically illustrated, Fig. 1 is a plan view showing a blank in initial position in the shaping mechanism;

Fig. 2 is a sectional view on line 2—2 of Fig. 1;

Fig. 3 is a similar view on line 3—3 of Fig. 1;

Fig. 4 is a view similar to Fig. 1 showing the position of the shaping members at the end of the shaping operation;

Fig. 5 is a sectional view on line 5—5 of Fig. 4;

Fig. 6 is a similar view on line 6—6 of Fig. 4;

Fig. 7 is a view of the recessing die and punch with the hexagonal blank arranged therein;

Fig. 8 is a similar view at the end of the recessing operation;

Fig. 9 is a sectional view showing the recessed blank arranged in a die for punching; and Fig. 10 is a similar view showing the end of the punching operation.

Referring to the drawing, the reference numeral 1 designates a blank of metal which is substantially square in outline and which is produced from suitable stock, such as bars or strips by a suitable punching or shearing operation. The thickness of the blank indicated at 2 in Figs. 2 and 3 is slightly less than the thickness of the hexagonal nut blank to be produced. The shaping mechanism consists of a pair of similar members 3 which are adapted to engage opposite corners of the blank as shown in Fig. 1 and which are provided with faces 4, each of which form two sides of the hexagonal blank. These faces are of slightly greater width than the thickness of the blank. Above and below the faces 4 the members 3 are provided with lips 4' which embrace the top and bottom faces of the blank being compressed. Arranged at right angles to the shaping members 3 are a pair of shaping members 5 which are adapted to engage the opposite corners of the blank and which are provided with substantially straight shaping edges 6 to form the other two sides of the hexagon. The faces 6 are of substantially the same dimension as the faces 4. The members 5 are provided with lips 6' above and below the shaping faces 6 which embrace the top and bottom faces of the blank being compressed.

In carrying out the step of the process illustrated in Figs. 1 to 6 of the drawing, the blank is first placed in position between the shaping members as shown in Figs. 1 to 3. The shaping members 3 and 5 are then moved inwardly by any suitable means to apply pressure to the four corners of the substantially square blank and cause the metal to be compressed. This compression causes the blank to assume the hexagonal shape formed by the cooperation of the faces 4 and 6 of the shaping members to produce a rough blank indicated in dotted lines at 7 in Fig. 4 of the drawing. The metal also flows toward the opposite faces of the blank whereby the blank is increased in thickness to substantially the desired finished thickness as indicated at 8 in Figs. 5 and 6 of the drawing.

The blank so produced is then ready for the recessing operation and is adapted to be placed in a die 9 which has a hexagonal opening substantially the size of the finished nut. A conical projection 10 is preferably arranged in the bottom of the die. A recessing punch 11 cooperates with the die, the body of the punch being hexagonal in cross section and having a boss 12 on its lower face which produces a recess in the upper face of the blank 7 when the punch is lowered from the position shown in Fig. 7 of the drawing to the position shown in Fig. 8. This recessing operation expands the metal outward or radially against the walls of the die producing a blank in finished shape and condition. The body portion 11 of the punch prevents the metal from flowing upwardly.

The recessed blank 7 is then placed in the punching die 13 shown in Figs. 9 and 10 of the drawing, which die has an opening 14 at the bottom thereof through which a punch 15 is adapted to move. Downward movement of the punch, as illustrated in Fig. 10 of the drawing, removes the scrap 16 to produce the finished blank. The blank is then ejected from the die by a tubular plunger 17.

The blanks 1 when cut off in a punching or shearing operation are provided with two rough sides and in the forming of the hexagonal blank it is necessary that this roughness be removed. By applying pressure simultaneously to the four corners of the blank or by first applying pressure to two opposite corners and then to the other two corners, the metal is squeezed in such manner that surplus metal may be left in the corners of the hexagonal blank so produced so that a hexagonal blank having smooth edges will be formed when the blank is submitted to the recessing operation illustrated in Figs. 7 and 8 of the drawing. The application of pressure at the four corners of a square blank permits as much surplus metal as is desired to be put in the corners of the hexagonal blank to overcome this roughness of the original piece of material from which the blank is shaped. Also it will be seen that the use of a square blank permits the production of a hexagon with less movement of the metal and therefore less distortion in the finished blank.

I claim:

1. The method of making hexagonal nut blanks which comprises subjecting a substantially square piece to pressure exerted diagonally on its opposite corners to produce a hexagonal blank.

2. The method of making hexagonal nut blanks which comprises subjecting a substantially square piece to pressure exerted diagonally on its opposite corners to cause it to assume a hexagonal shape and to increase in thickness and pressing a central recess in the thickened piece while retaining it in a hexagonal die.

3. The method of making hexagonal nut blanks which comprises subjecting a substantially square piece to pressure exerted diagonally on its opposite corners to produce a hexagonal blank and then piercing said blank.

4. The method of making hexagonal nut blanks which comprises subjecting a substantially square piece to pressure exerted diagonally on its opposite corners to cause it to assume a hexagonal shape and to increase in thickness, pressing a central recess in said blank and then piercing said blank.

JOSEPH WILLIAM GIBNEY.